United States Patent
Karimpour

(10) Patent No.: US 11,270,812 B2
(45) Date of Patent: Mar. 8, 2022

(54) POWER UMBILICAL WITH IMPACT PROTECTION

(71) Applicant: Aker Solutions AS, Lysaker (NO)

(72) Inventor: Mehrdad Karimpour, Oslo (NO)

(73) Assignee: Aker Solutions AS, Lysaker (NO)

(*) Notice: Subject to any disclaimer, the term of this patent is extended or adjusted under 35 U.S.C. 154(b) by 68 days.

(21) Appl. No.: 16/669,722

(22) Filed: Oct. 31, 2019

(65) Prior Publication Data

US 2020/0176149 A1    Jun. 4, 2020

(30) Foreign Application Priority Data

Dec. 4, 2018  (NO) .................................. 20181565

(51) Int. Cl.
| | | |
|---|---|---|
| *H01B 7/04* | (2006.01) | |
| *H01B 7/18* | (2006.01) | |
| *H01B 9/00* | (2006.01) | |
| *H01B 9/02* | (2006.01) | |
| *H01B 7/14* | (2006.01) | |

(52) U.S. Cl.
CPC .............. *H01B 7/045* (2013.01); *H01B 7/14* (2013.01); *H01B 7/187* (2013.01); *H01B 9/003* (2013.01); *H01B 9/005* (2013.01); *H01B 9/027* (2013.01)

(58) Field of Classification Search
CPC .......... F16L 11/22; F16L 53/37; H01B 7/045; H01B 7/14; H01B 7/183; H01B 7/187; H01B 7/189; H01B 9/003; H01B 9/005; H01B 9/027

See application file for complete search history.

(56) References Cited

U.S. PATENT DOCUMENTS

| | | | | |
|---|---|---|---|---|
| 3,170,026 | A * | 2/1965 | Woodson ................. | H01B 7/29 174/15.6 |
| 3,429,979 | A * | 2/1969 | Davey ................. | H01B 9/0611 174/15.6 |
| 3,924,054 | A * | 12/1975 | Falke ....................... | H01B 7/29 174/15.6 |
| 5,281,757 | A * | 1/1994 | Marin .................... | H01B 7/189 174/102 SC |
| 6,349,161 | B1 * | 2/2002 | Gleason ............... | G02B 6/4427 385/113 |
| 6,417,457 | B1 * | 7/2002 | Aasbo .................... | H01B 7/184 174/120 R |

(Continued)

FOREIGN PATENT DOCUMENTS

| | | |
|---|---|---|
| CN | 204204489 U | 3/2015 |
| CN | 204680430 U * | 9/2015 |

(Continued)

*Primary Examiner* — William H. Mayo, III
*Assistant Examiner* — Rhadames Alonzo Miller
(74) *Attorney, Agent, or Firm* — Shackelford, Bowen, McKinley & Norton, LLP

(57) ABSTRACT

The invention concerns a subsea umbilical comprising an electrical conductor (2) and/or a fluid pipe, and an outer sheath (7) surrounding the electrical conductor (2) and/or the fluid pipe. The umbilical (1, 20, 21, 25, 30, 40, 51, 60) further comprising a plurality of deformable rods (3a, 3b, 15, 23a, 23b, 26a, 27a, 26b) evenly distributed between the electrical conductor (2) and/or the fluid pipe, and the outer sheath (7) for radial load protection of said electrical conductor (2) or fluid pipe.

14 Claims, 10 Drawing Sheets

(56) References Cited

U.S. PATENT DOCUMENTS

| | | | | |
|---|---|---|---|---|
| 6,501,027 B1* | 12/2002 | Belli | ................... | H01B 7/185 |
| | | | | 174/110 F |
| 10,170,219 B2* | 1/2019 | Willemoes | ............. | H01B 9/005 |
| 2006/0076155 A1* | 4/2006 | Belli | ................. | H01B 9/02 |
| | | | | 174/102 SC |
| 2006/0243471 A1* | 11/2006 | Karlsen | .................. | F16L 53/37 |
| | | | | 174/15.1 |
| 2007/0205009 A1* | 9/2007 | Figenschou | ............ | F16L 11/127 |
| | | | | 174/47 |
| 2010/0012342 A1* | 1/2010 | Figenschou | ............ | F16L 11/22 |
| | | | | 174/47 |
| 2010/0054677 A1* | 3/2010 | Figenschou | ............ | H01B 7/045 |
| | | | | 385/101 |
| 2011/0067881 A1* | 3/2011 | Blake | ...................... | E21B 37/06 |
| | | | | 166/352 |
| 2011/0147047 A1* | 6/2011 | Madden | .............. | E21B 33/0385 |
| | | | | 174/126.1 |
| 2012/0234597 A1* | 9/2012 | Madden | ............... | H02G 15/076 |
| | | | | 174/74 R |
| 2012/0241040 A1* | 9/2012 | Fogg | .................. | E21B 43/0107 |
| | | | | 138/172 |
| 2012/0267165 A1* | 10/2012 | Osborg | .................. | H01B 7/045 |
| | | | | 174/70 R |
| 2013/0048373 A1* | 2/2013 | Fogg | ..................... | D07B 1/147 |
| | | | | 174/70 R |
| 2013/0051740 A1* | 2/2013 | Fogg | ..................... | H01B 7/045 |
| | | | | 385/101 |
| 2014/0034350 A1* | 2/2014 | Nelson | .................. | B29B 15/122 |
| | | | | 174/47 |
| 2014/0127439 A1* | 5/2014 | Kline | .................... | B32B 27/12 |
| | | | | 428/36.91 |
| 2015/0144374 A1* | 5/2015 | Whiddon | ............... | E21B 33/0355 |
| | | | | 174/113 R |
| 2015/0234143 A1* | 8/2015 | Smith | .................... | G02B 6/4434 |
| | | | | 702/2 |
| 2015/0354292 A1* | 12/2015 | Frazer | .................... | F16L 11/22 |
| | | | | 428/36.3 |
| 2018/0374613 A1* | 12/2018 | Zymelka | ................ | H02K 15/04 |
| 2019/0186239 A1* | 6/2019 | Rutherford | ........... | E21B 17/023 |
| 2019/0378635 A1* | 12/2019 | Parris | .................... | D07B 1/147 |

FOREIGN PATENT DOCUMENTS

| | | |
|---|---|---|
| CN | 106128582 A | 11/2016 |
| CN | 108666022 A | 10/2018 |
| CN | 208027800 U | 10/2018 |
| CN | 108735353 A | 11/2018 |
| EP | 2515606 A2 | 10/2012 |
| NO | 20065943 L | 6/2008 |
| NO | 328457 B1 | 2/2010 |
| WO | WO-2008075964 A1 | 6/2008 |
| WO | WO-2012142098 A2 | 10/2012 |

\* cited by examiner

POWER UMBILICAL WITH IMPACT PROTECTION

TECHNICAL FIELD

The present invention relates to a subsea power umbilical or a cable. The invention relates in particular to a subsea power umbilical or cable that is particularly exposed to impact load when in use and that needs radial protection from the impact, such as a piggyback heating cable.

BACKGROUND ART

Power umbilical is a general term of an elongate cable system that most commonly link surface and seafloor oil and gas equipment for controls power or heat. The umbilical can provide for instance electric signals, fiber optic signals, electrical power, hydraulic or chemical injection fluids to the subsea unit. They can also power subsea boosting and compression, as well as provide flow-line heating of a production pipe to prevent the formation of wax and hydrates that could slow the oil production. The power umbilical that are used for heating the flow line is hereinafter defined a piggyback heating cable.

Publication U.S. Pat. No. 6,417,457 discloses an electrical subsea cable with a conductor insulation and a sheath. The publication discloses an impact absorption by using rubber-like inner layer of soft thermoplastic polyurethane elastomer layers in combination with an outer layer. In one variant, the inner layer having inner grooves on the inside which are filled with water which enhances the dampening properties.

However, in this publication there are arranged protection layers that are either extruded onto the cable or arranged as several layers arranged outside of the cable. In both embodiments that layers are made as a solid continuous layer surrounding the entire cable.

Publication EP2515606 relates to a piggyback heating cable comprising an electrical conductor and an outer sheath surrounding the electrical conductor with rods surrounding the electrical conductor.

Publication CN208027800 discloses another example of a prior art umbilical with electric power, and outer sheath and rods.

However, none of the prior art discloses an improved protection against radial loads through deformable rods.

CN108735353 discloses a prior art documents of flexible cables with heat dissipation effect. Further, CN204204489 discloses an anti-compression cable.

SUMMARY OF INVENTION

The invention relates to a power umbilical comprising an electrical conductor and a sheath surrounding the electrical conductor. The power umbilical further comprising a plurality of deformable rods evenly distributed between the electrical conductor and the sheath for radial load protection of said electrical conductor.

Preferable embodiments of the invention are set out in the dependent claims, to which reference are made.

Power umbilical according to the invention has the advantage that the protection element is easy to integrate in the cross section of the power umbilical. This will ease the manufacturing process. The power umbilical is further flexible in that various parts of the power umbilical could have different protection elements, ie both different material, different hardness and/or various shape in order to customize the power umbilical to the specific requirement.

The present invention relates to a power umbilical with deformable rod that is enabled to be to easily integrated in the cross section due to the form as having a small cross section in the power umbilical combined with the torsional stiffness of the rods.

This invention also enables bundling of the elements into the umbilical from "fixed" positions which are reserved for tubes and power cores.

Hence, the inclusion of deformable rods will ease the manufacturing process. The manufacturing of the rods is also easier than traditional hollow profile element or a complete layer or ring surrounding the entire cable. The prior art profiles have to be orientated a specific way in the manufacturing process. The rods can be orientated in any direction. This provides a manufacturing process where there is no need for a specific location on the bobbins on the rotating carousels (which keep them all pointed the right way). Instead it could be a stationary bobbin located off from the machine which does the helical assembly. The cylindrical rods are particularly suitable to orient in any direction.

Another advantage of the deformable rods over traditional hollow profiles is that this means that the cable could be arranged in the center of the power umbilical. This will provide a more compact design than an umbilical with hollow profiles since it is possible to get a tuneable protection by adjusting the flexibility and shape of the rods around the fibre optic cable.

In a traditional power umbilical, like the DEH cable with hollow design having a FO cable, in order to get enough impact protection round the FOC, it is required needed to make the hollow profiles much larger around that side. This results in a conductor that is off centre.

A further advantage with the rods according to the invention is that is requires less material in the rods than in the existing solutions.

Yet another advantage is that a further cable or line can be integrated in spaced areas between the rods without the need of a predefined filler element. This is especially advantageous in cables where there are only one or a few further cables or lines, such as DEH cable.

DETAILED DESCRIPTION OF THE INVENTION

The wording "umbilical" should be interpreted in its broadest terms. The term is defined as elongated bundle of various elements that supplies required consumables to a defined end apparatus or person. The umbilical may comprise one or more of the following elements; a power cables, a fluid pipe, a fiber optic cable, a strength element, control cable, metal rod etc. The term has often been used in relation to subsea installation to supply for instance necessary energy, (electric or hydraulic) and chemicals to equipment related to subsea oil and gas wells. The terms are also applicable for subsea power cable assemblies intended for transfer of electric energy, hydraulic fluid or other chemicals etc to other offshore installations, for instance oil and gas installations or offshore renewables such as wind generator.

The term is also applicable to piggyback heating cables or other cables intended for heating of a fluid pipe arranged on the seabed. These kind of cables and especially the cables that is arranged close to the pipeline, referred to as piggyback cables, are especially exposed to damage and thus require high impact protection.

The simplest form of a power umbilical is a bundle of at least one power cable or conductor with surrounding filler materials/protection element and an outer sheath. The power umbilical could additionally have one or more load carrying elements, fiber optic cables, strength band or tapes etc as disclosed above. The power umbilical could also have smaller fluid pipes for transportation of fluids, for instance hydraulic fluids. The fluid pipes could for instance be made of steel.

The power umbilical according to the invention can also be a multipower cable with three conductors in for instance a three-phase conductor. Other examples that is not shown, can be other multicore cables, a control umbilical with lines with electrical and/or fiberoptic signal. For example, a power umbilical with combined dc power and fibre optic and optionally a fluid pipe. The power umbilical can also be an integrated production umbilical with a production pipeline embedded in the umbilical, or an integrated service umbilical with addition of one or more lines for service fluid, such as hydraulic or MEG. Other examples can be a multi core piggyback power cable, used for heating.

The power umbilical according to the invention could be manufactured in a twisted bundle as described in NO20065943 or SZ laid as described in NO20065943. The invention is however not restricted to these methods of manufacturing.

The invention may also relate to an umbilical with one or more fluid pipes, without the conductor.

The term deformable rods include both single deformable rods and double deformable rods as referred to throughout the description.

Figure 1:
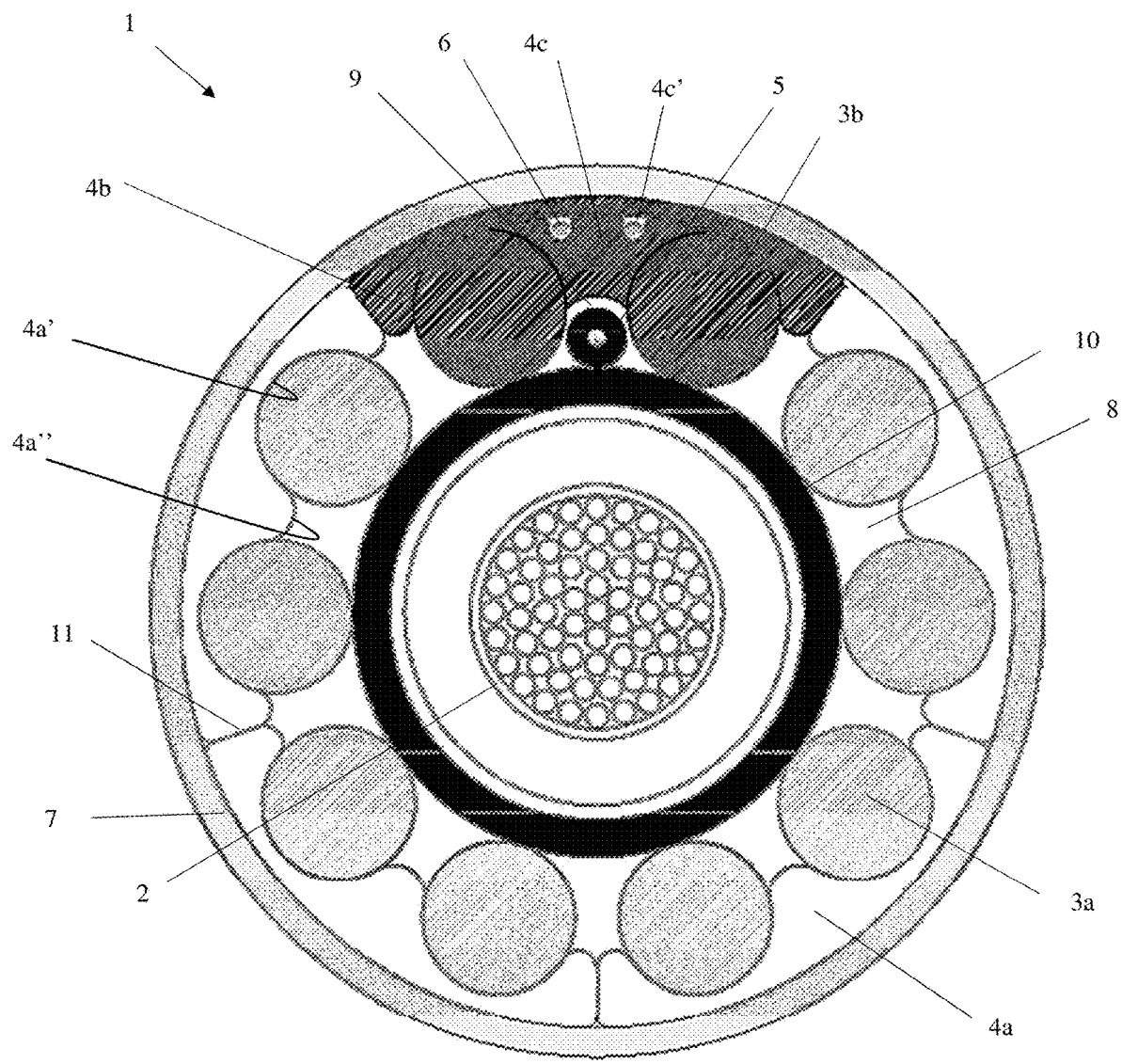
FIG. 1 shows a power umbilical according to a first embodiment of the invention with separately arranged bridge and semiconductor rods protecting a fiber optic cable.

FIG. 1 shows a power cable or power umbilical 1 according to a first embodiment of the invention, hereinafter referred to as power umbilical. The power umbilical 1 has one cable or conductor 2 for transferal of electrical energy through the umbilical 1. The conductor 2 comprising an outer insulation layer 10. The conductor 2 is normally made of a core of copper wires, however the conductor 2 may also be made of aluminium or other metals that provides sufficient transfer of electric energy throughout the conductor 2. The surrounding insulation layer 10 is typically made of a cross linked polyethylene, but other materials may be possible. The insulation layer 10 may also be of a semiconductive material or have a layer of semiconductive material.

The power umbilical 1 according to the FIG. 1 can be a DEH cable designed for use in flowlines and pipelines to prevent the formation of wax and hydrated, which again could slow the stream of hydrocarbons. The invention is particularly advantageous as a piggyback heating cable where the piggyback heating cable is strapped to or lies in a close proximity to the pipeline to be heated and is further electrically connected to the pipeline to transfer heat in a direct electrical connection.

Figure 6:
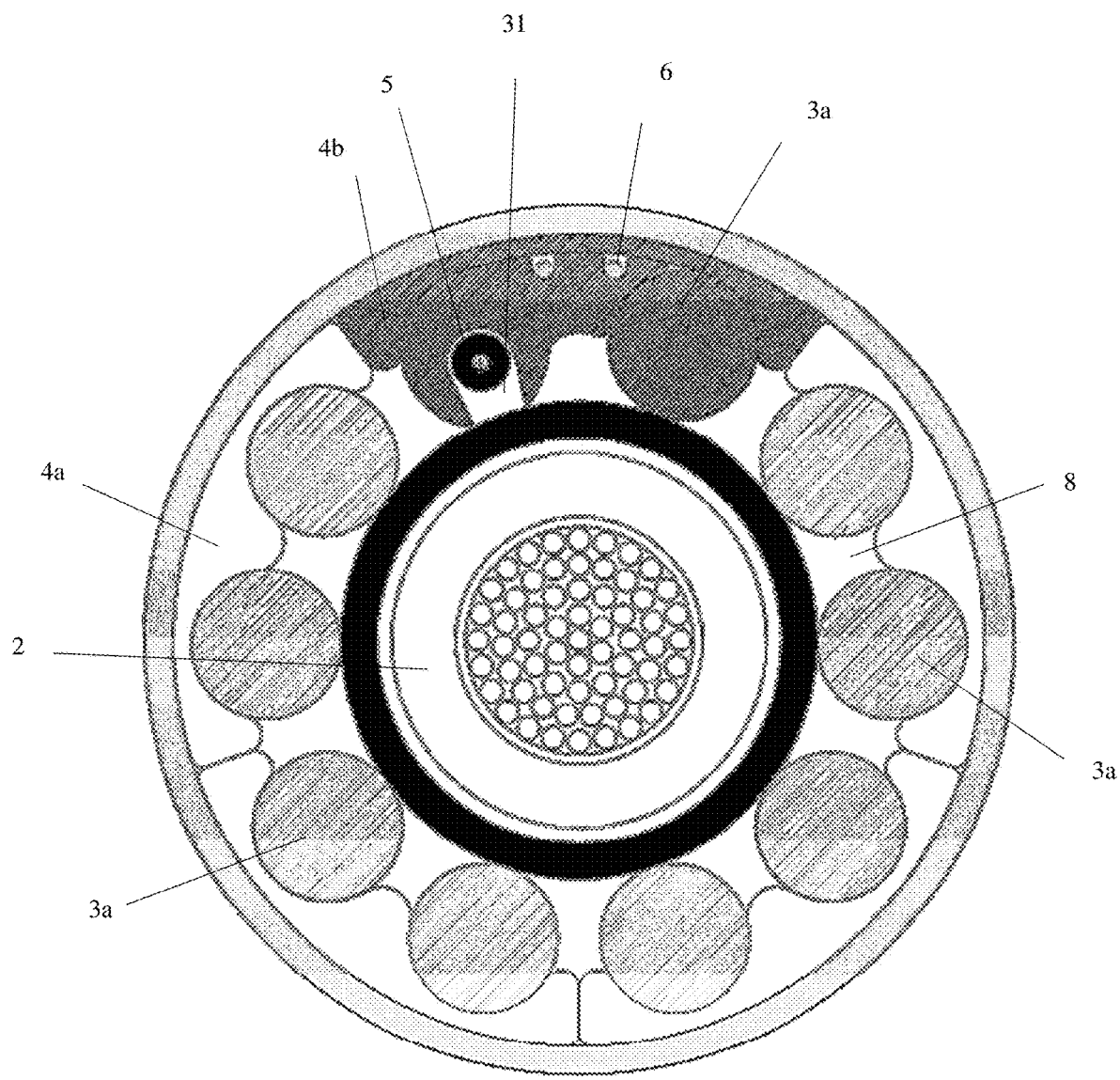
FIG. 6 shows a power cable or a power umbilical according to a further embodiment of the invention where a fiber optic cable is arranged in a recess of one of the deformable rods.
Figure 7:
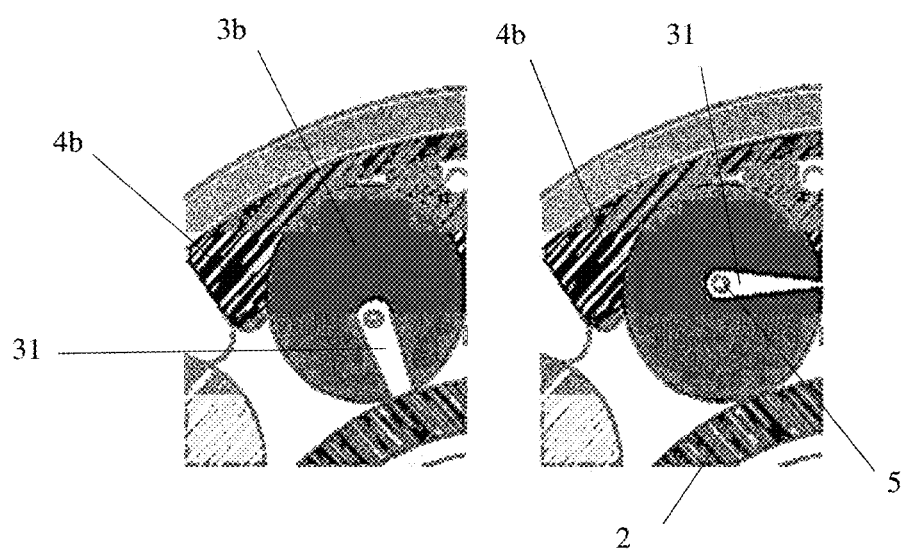
FIG. 7 shows a cross sectional view of the power cable or power umbilical shown in FIG. 6 under local impact.
Figure 8:
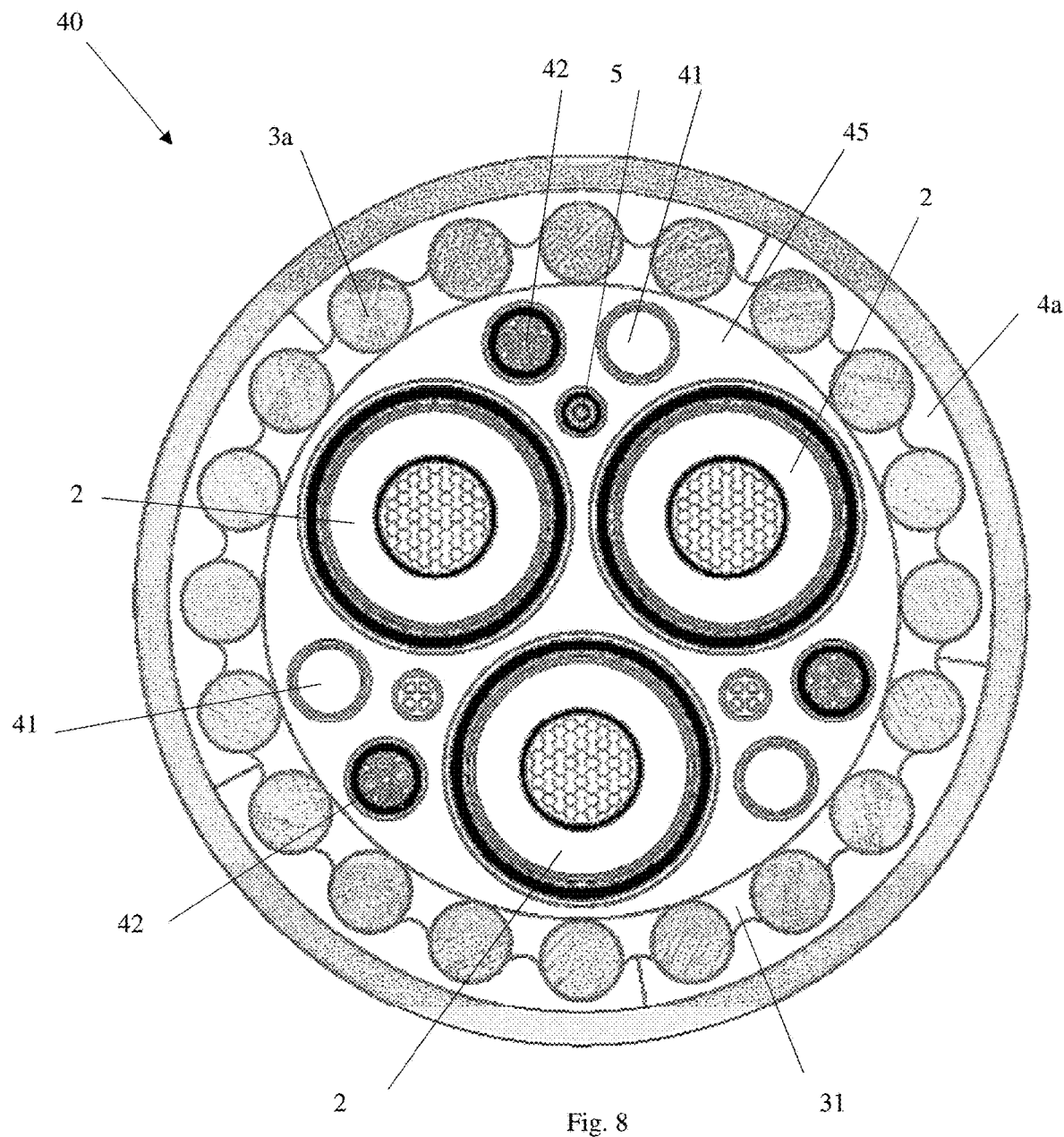
FIG. 8 shows a multicore power umbilical according to a fifth embodiment of the invention where the umbilical comprising further additional power conductors and other cables and lines surrounded by the deformable rods and the outer protection layer or elements.

The FIGS. 1-8 illustrates a DEH cable or a piggyback heating cable with one cable or conductor 2 centrally arranged in the umbilical 1. The power umbilical, for instance a multipower cable with three conductors in a three-phase conductor is illustrated in FIGS. 8 and 9c. The power umbilical could however be other umbilicals, as mentioned above.

The power umbilical 1 in FIG. 1 further comprises a plurality of single deformable rods 3a, 3b. These rods 3a, 3b spread around the conductor 2 with substantially the same distance between the rods 3a, 3b.

Each single deformable rod 3a, 3b is made of a material that is able to deform when exposed to impact loads. A further characteristic of the rod material is also that it is adapted to retain the original shape when the impact load is removed.

Suitable material of the single deformable rod 3a, 3b can for instance be rubber, rubber like soft thermoplastic polyurethane elastomer.

Each single deformable rod 3a, 3b has a combination of material and thickness so that the impact is obtained by the single deformable rods 3a, 3b without being transferred further to the element (s) arranged at the inner side of the single deformable rods 3a, 3b, such as the conductor 2 in the embodiment of FIG. 1. The single deformable rods 3a, 3b in the figures have a circular shape.

Figure 4:
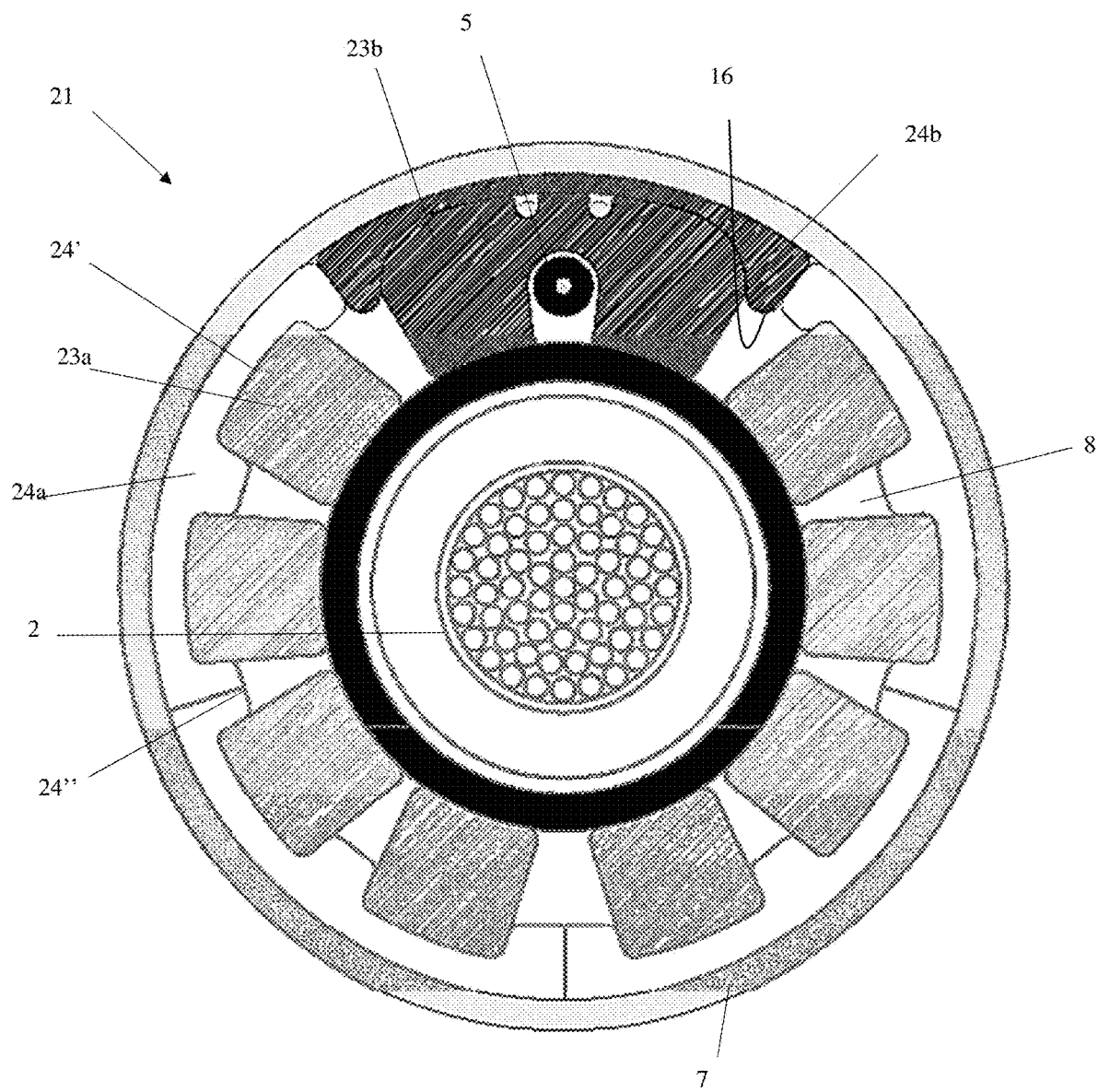
FIG. 4 shows an embodiment of the power umbilical where the deformable rods have a substantially square cross section.
Figure 5:
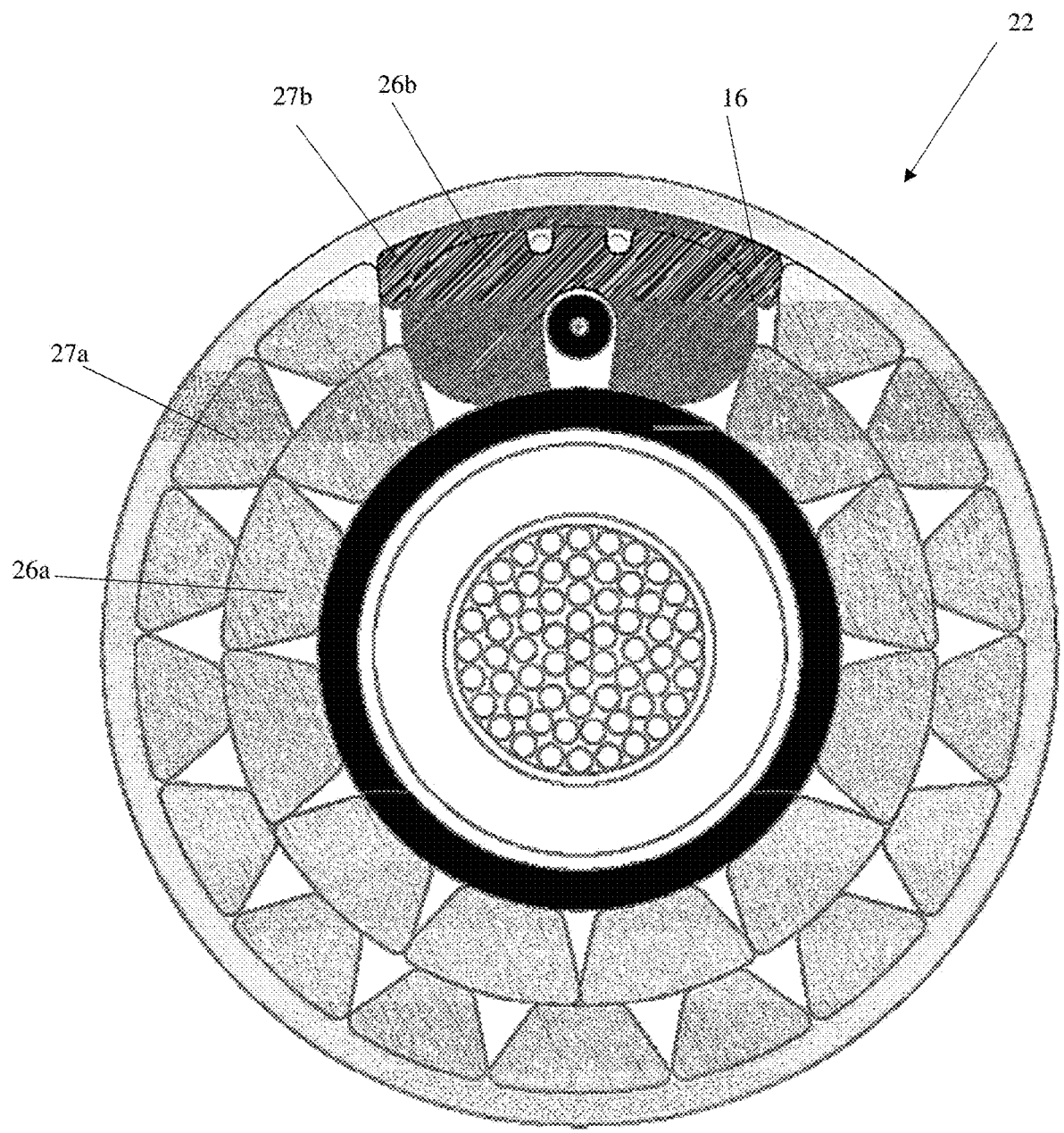
FIG. 5 shows an embodiment of the power cable where the deformable rods having a trapezoid cross section and the deformable rods are arranged in two concentrically layers.

However, other shapes are possible such as square, rectangular or similar. Examples of other shapes are shown in FIGS. 4 and 5.

Some or parts of the single deformable rod 3a, 3b could be made of a semiconducting material. These single deformable rods that have reference number 3b in the figures could either be made entirely of a semiconducting layer or a part of the rod 3b could be made of a semiconducting layer. This could for instance be a coated layer of a semiconducting material applied to the outside of the rods made of the rod material as described above.

A suitable semiconducting material can for instance be made by including carbon in the materials of the single deformable rod 3a as referred to above.

The semiconductive material provides a draining away of capacitive currents in the power umbilical 1. When deployed at sea these capacitive currents may be drained out via seawater flooded holes, or via semiconductive elements 3b, 4b, 7 to the surrounding seawater.

The single deformable rods that are not made semiconductive are referred to as 3a. In FIG. 1 there are shown two semiconductive single deformable rods 3b and eight non-semiconductive single deformable rods 3a. This is only an illustrative example, any combination of semiconductive single deformable rod 3b and non semiconductive single deformable rods 3a are possible. This also includes a power umbilical where all of the single deformable rods 3b are semiconductive, a power umbilical 1 where all of the single deformable rods 3a are non-semiconductive, and all variants of semiconductive 3b/non semiconductive rods 3a in the range between these. These variants are all embodiments of the invention.

A further variant of the power umbilical 1 is that there may be single deformable rods 3a, 3b of different hardness, ie single deformable rods 3a, 3b made of solid materials like different rubber or rubber like material. It is thus possible to easily fine tune the power umbilical to adopt a specific purpose by changing the rubber stiffness of the single deformable rods 3a, 3b in for instance a part of the power umbilical 1.

It is to be noted that in an embodiment of the power umbilical of the invention, the single deformable rods 3a, 3b may be arranged directly in contact with an outer sheath 7 surrounding the power umbilical and the elements. The outer sheath 7 has in this embodiment a greater hardness than the deformable rods 3a, 3b.

However, the power umbilical 1 in FIG. 1 comprises further an outer layer, in the figures the outer layer is shown as several outer layer elements 4a, 4b surrounding the single deformable rods 3a, 3b.

Some of the outer layer elements 4b in FIG. 1 can be semiconductive, either completely or part of the outer layer element 4b similar as described in relation to the semiconductive single deformable rods 3b.

The remaining outer layer elements 4a are made of a non-semiconductive material.

The material of the outer layer elements 4a, 4b, both the semiconductive and the non-semiconductive must have a mechanical hardness that is higher that the hardness of the single deformable rods 3a, 3b. This material can for instance be polyamide, rubber, plastic. This provides an additional impact protection in the umbilical to withstand particularly high impact loads.

The semi-conductive outer layer elements 4b can be made of the same material as the semiconductive single deformable rods 3b with the addition of carbon.

Each of the outer layer elements 4a may preferable have a shape so that the layers follow the shape of the single deformable rods 3a when engaged with the single deformable rods 3a. The outer layer elements 4a thus could have a half circular shape or recess 4a' as show in the figure. If the outer layer elements 3a have other shapes, such as square, rectangular etc, the shape of the non-semiconductive outer layer element 4a facing the single deformable rods 3a would have a corresponding shape. The area between the recess 4a' is formed as a wedge 4a" to keep a distance between the single deformable rods 3a and keep the rods 3a, 3b firmly in one place without moving.

This matching of the shapes of the single deformable rods 3a and the outer layer elements 4a and a consequently wedge 4a" would result in that the single deformable rods 3a are held at a predefined distance apart from each other around the power cable 1. The single deformable rods 3a would then have a space 8 surrounding each single deformable rods 3a allowing the single deformable rods 3a to be deformed when exposed to an impact load. This will be further explained in FIG. 2.

The space 8 may also be flooded with seawater when deployed at the seabed. This adds to the impact protection, as well as helping the buoyancy and cooling.

The design of the outer layer element 4a in FIG. 1 shows that each outer layer elements engage with two single deformable rods 3a. This is only an illustrative example. Other designs of the outer layer element 4a is possible, for instance one outer layer element for each single deformable rods 3a, or three or more single deformable rods 3a engaging with each outer layer element. The outer layer element could also be made as a continuous layer surrounding all of the single deformable rods 3a.

The semi-conductive outer layer element 4b could also have the same design as described above related to the non semiconductive outer layer element 4a. The description above related to the non-semiconductive outer layer element 4a is thus also applicable to the semiconductive outer layer element 4b.

Another possible design of the semiconductive outer layer element 4b is shown in FIG. 1. In this figure, the semiconductive outer layer element 4b form a layer to engage the outer layer element 4b of two adjacent single deformable rods 3a, 3b. The rods 3a, 3b could be both semiconductive or non-semiconductive. The rods 3b that interact with the semiconductive outer layer element 4b is preferable semiconductive to drain off the capacitive current.

Further in FIG. 1, there is arranged a separate bridge 4c between the single deformable rods 3a, 3b. This bridge 4c is a separately arranged part that has a similar shape as the wedge 4a" described above. The bridge 4c could have one or several recesses 4c' for receiving metal rod or tape 6 in order to drain capacitive current during onshore testing. The recesses 4c'. The metal rods or tape 6 may be arranged differently than shown in the figure. As embodiments, the metal rod or tape 6 can be embedded or arranged in a recess in the single deformable rod 3b or outer layer element 4b.

The power cable or umbilical 1 of FIG. 1 further shows a fibre optic cable 5 arranged in one of the spaces 8 between two single deformable rods 3a, 3b. In the case where a power umbilical has a component containing a ferrous material, such as ferrous metal, the rods surrounding the component, must be semiconductive. A piggyback heating cable normally comprises a fibre optic cable having a metal tube for protection of the fiber optic cable.

The fibre optic cable 5 is preferable arranged between two semiconductive single deformable rods 3b as shown in the FIG. 1, the single deformable rods 3b may however also be non-semiconductive when the power umbilical is not a DEH cable. The fiber optic cable 5 may also be provided with a rubber tube surrounding the cable 5 as illustrated in FIG. 1-5, 9a-9c.

These single deformable rods 3a, 3b surrounding the fiberoptic cable 5 can be made of a mechanically harder material than the remaining single deformable rods 3a, 3b to better protect fragile elements, such as the fiber optic cable 5.

In the embodiment of the figure the outer sheath 7 surrounding the outside of the outer layer elements 4a, 4b holding all the components together in the power umbilical 1. This outer sheath 7 may also be made of a semiconductive material, either totally or a part of the sheath 7.

FIG. 1 further shows a sectional view of the arrangement of the bridge 4c, deformable rods 3a, 3b and the fiberoptic cable 5 according to the embodiment shown in FIG. 1 of the invention.

From the figure it is also shown that the outer surface of the bridge 4c facing the single deformable rods 3a, 3b and follows the shape of the single deformable rods 3a, 3b to support the single deformable rods 3a, 3b from moving unintentionally.

The FIG. 1 also shows a space 9 arranged between the fiber optic cable 5 and the bridge 4c.

The recess(es) 4c' in the bridge 4c is arranged in the surface facing the semiconductive outer layer element 4b.

This results in that the metal rod or tape 6 (FIG. 1) is completely surrounded by the semiconductive outer layer elements 4b and the semiconductive bridge 4c when arranged in the recess 4c'.

In FIG. 1 the end portions 11 of two neighboring outer layer elements 4a, 4b are equal and radially abutting each other as shown in the figure. However other arrangements are possible.

Figure 2:
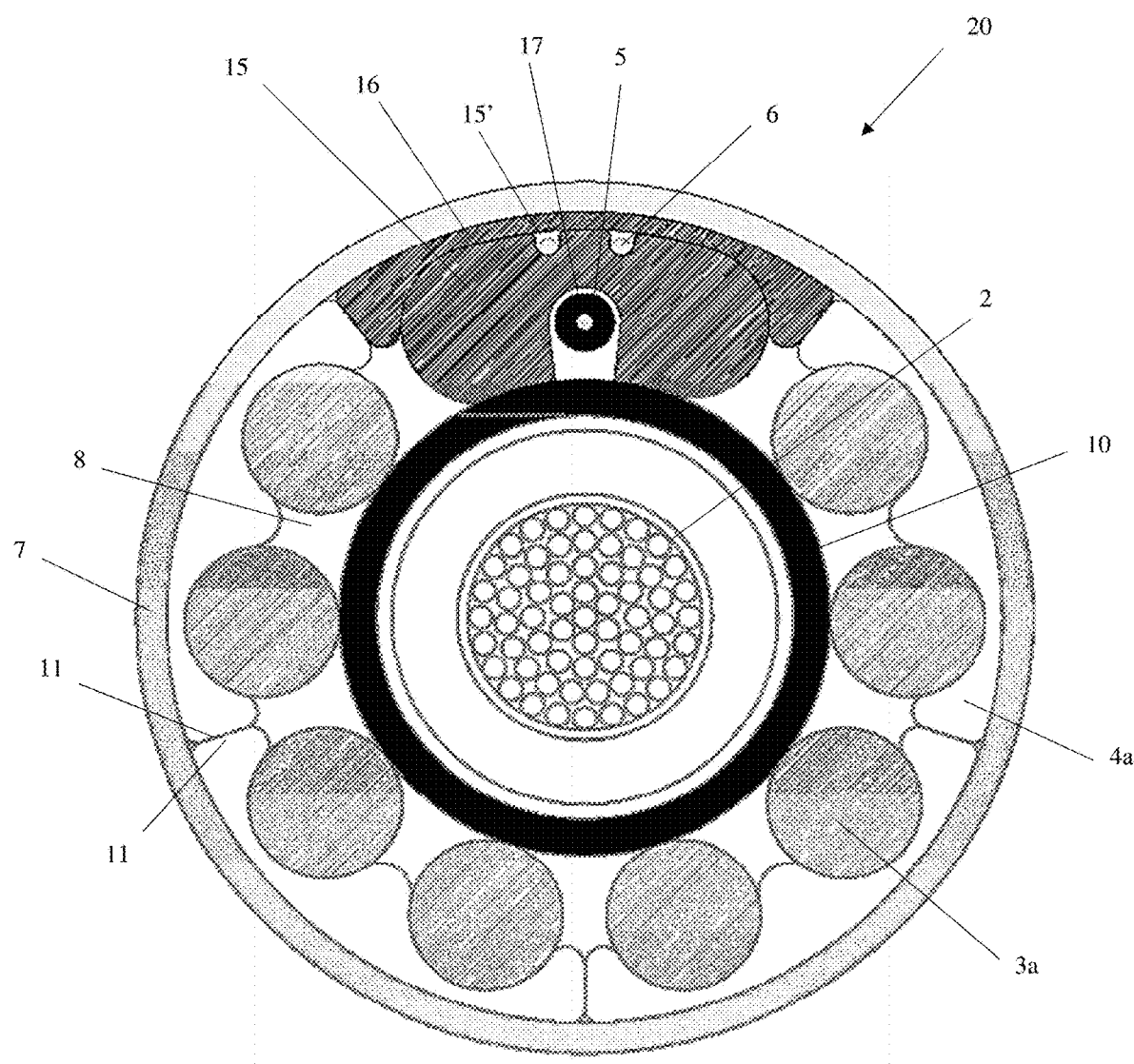
FIG. 2 shows a power umbilical according to another embodiment of the invention with a continuous fiber protecting element.

FIG. 2 shows another embodiment of a power umbilical 20 according to the invention. The features that are equal in the FIG. 1 have the same numeral and are further described in relation to FIG. 1.

The power umbilical 20 comprises a double deformable rod element 15. This double deformable rod element 15 have similar shape as two separate single deformable rods 3a, 3b and the bridge 4c from FIG. 1. The double deformable rod element 15 is a continuous element that has a space 17 in the middle of the deformable rod element 15 for receiving the fiber optic cable 5. This is shown in the FIG. 2. The space 17 is formed as a recess with an opening towards the conductor 2 in the power umbilical 20. This double deformable rod element 15 provides an improved protection on the fiber optic as it surrounds three sides of the fiber optic cable 5.

The figure further shows the semiconductive outer layer element 4b arranged between the double deformable rod 15 and the outer sheath 7 supporting the double deformable rod 15 as in the previous embodiments.

Figure 3:
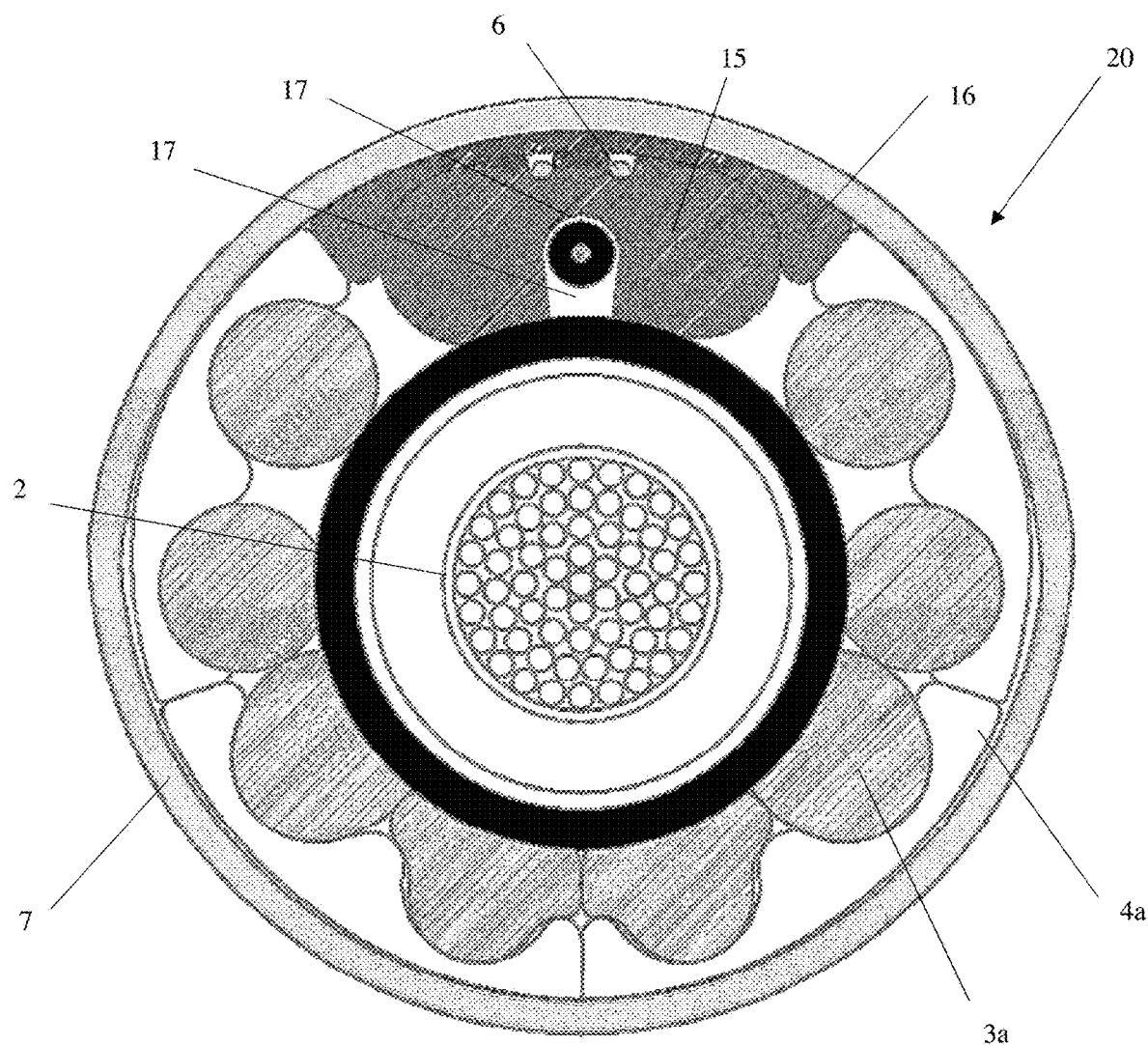
FIG. 3 shows the power umbilical shown in FIG. 2 with double deformable rods when exposed to local impact.

In a similar way as in the FIG. 1-3 there are arranged recess(es) 15' in the double deformable rods for the metal rod or tape as illustrated in the figure.

FIG. 3 illustrating the deformation of the double deformable rod element 15 due to impact load from the surroundings. A similar deformation will occur with the embodiment having separate single deformable rods 3a, 3b and the spacer 4c protecting the fiber optic cable 5.

As shown in the figure, the single deformable rods 3a will deform and fill the space 8 that normally is present between the single deformable rods 3a, 3b when the power umbilical is not exposed to the impact.

How much the single deformable rods 3a, 3b that deforms by the impact depends highly on how great the impact is and the distance from the source of the impact on the power umbilical 20 and the single deformable rod 3a, 3b. In the FIG. 3, the power umbilical 20 is exposed to an impact from below causing the single deformable rods 3a close to the impact to be more deformed than the double deformable rod element 15 and the neighboring rods 3a that is arranged further away from the impact.

The fiber optic cable 5 can however be moved within the space 17 and is thus protected from the impact loads within the space 17, as shown in FIG. 3.

Similar deforming of the rods 3a, 3b will occur in all of the other embodiments of the invention when exposed to impact loads.

FIGS. 4 and 5 shows further embodiment of a power umbilical 21, 22 with single deformable rods 23a, 26a, 26b and double deformable rods 23b, 26b having different cross sections. The single deformable rods 23a shown in FIG. 4 has a square cross section. The double deformable rod 23b has also square shaped end portions. In addition, there are arranged outer layer elements 24a, 16 adapted to mate with the shape of the single deformable rods 23a and the double deformable rod 23b as shown in the figure.

FIG. 5 shows an embodiment where there are arranged two layers of single deformable rods 26a, 27a. The single deformable rods 26a, 27a in each layer having a trapezoid form. In this embodiment the single deformable rods in the second, outer layer 27a is in contact with the outer sheath 7, replacing the previous outer layer elements 4a, 4b, 24a that are arranged outside of the single deformable rods 26a.

In the embodiment of FIGS. 4 and 5, the double deformable rod 23b, 26b and the outer layer element 16 in contact with these elements are illustrated as semiconductive. The single deformable rods 23a, 26a, 27a are not semiconductive. The outer layer elements 24a in FIG. 4 in contact with the single deformable rods 23a are also not semiconductive. These embodiments are only an illustrating and example that are particularly suitable for DEH cables as mentioned previously.

Further, the FIGS. 4 and 5 are only illustrating examples of possible shapes of the single deformable rods 23a, 26a, 27a. The deformable rods can also have other shapes. Each of the shapes can also be arranged in one or more layers around in the power umbilical. All of the deformable rods and double deformable rods in the embodiments are however spaced apart so that there are formed a space 8 between the single deformable rods/double deformable rods.

FIG. 6 shows a further embodiment of the invention. This embodiment is similar to the embodiment disclosed in FIG. 1 where there are two semi-conductive single deformable rods 3b with a semi-conductive outer layer element 4b and a separate bridge 4c arranged between two single deformable rods 3a, 3b.

In this embodiment, the fiber optic cable 5 has been arranged in a recess 31 in one of the single deformable rods 3a, 3b as shown in the FIG. 6.

A further embodiment not shown is that the fiberoptic element 5 is embedded into the deformable rod which has added heat conductivity material to ensure heat transfer to the fiber optic cable 5.

The remaining features of the power umbilical 30 are similar to the power umbilical 1 of FIG. 1 and the reference number refers to the same features.

The double deformable rod element 15 as from FIG. 2 could also equally be provided with a recess in one of the deformable rod-shaped part of the element 15 in a similar way as in FIG. 6 (not shown). The deformable rods could have different shapes as described in the other embodiments, for instance square, circular, curved on one side to closely fit against the conductor 2 or other central element and stay oriented towards it. The fiber optic cable 5 for sensing is thus kept in close proximity to the conductor 2 or other central element for a better reading.

FIG. 7 shows a cross-sectional view of how an impact load on a single deformable rod 3a, 3b or the double deformable rod element 15 would be influenced when there is a recess in the rod or rod shape to receive the fiber optic cable 5. In the figure, the recess 31 is oriented with its opening towards the conductor 2 or central element. The recess opening is thus pointed towards the middle of the power umbilical. This provides an improved protection for the fiber optic cable 5.

As further shown in FIG. 7, the single deformable rod 3a, 3b may further be enclosed around the fiber optic cable 5 when exposed to the impact load, and at the same time reducing the size of the recess 31.

FIG. 8 shows that single deformable rods 3a and possibly the outer protection layer elements 4a are also applicable to other arrangements of umbilicals that needs impact protection.

The FIG. 8 illustrates a power umbilical 40 with three power cables 2, and various other elements, like fluid pipes 41, fiber optic cable 5, four core electrical control lines 42. The umbilical is also known as a three-phase power umbilical 40.

The various elements 2, 5, 41, 42 may be surrounded by at least one center filler 45 as disclosed in the FIG. 8. There can for instance be three substantially solid center fillers element 45, each surrounding a predefined number of elements 2, 5, 41, 42. The center filler 45 may have empty holes in the profiles to receive the elements 2, 5, 41, 42. In the example with three center fillers 45, all of the center fillers 45 may be equal to standardize the manufacturing or buying the center fillers 45. This may result in that not all empty holes 43 receives an element when assembled, such as the holes 43 illustrated by reference number 43 in FIG. 8.

The figure further shows the single deformable rods 3a outer layer element (s) 4a and a sheath 7 arranged outside of the center filler(s) 35 in a similar way as disclosed in the FIG. 1-8. This embodiment only discloses non semiconductive elements, some or all of the deformable elements, outer layer elements and/or the sheath may be semiconductive as an embodiment of the invention.

Figure 9A:
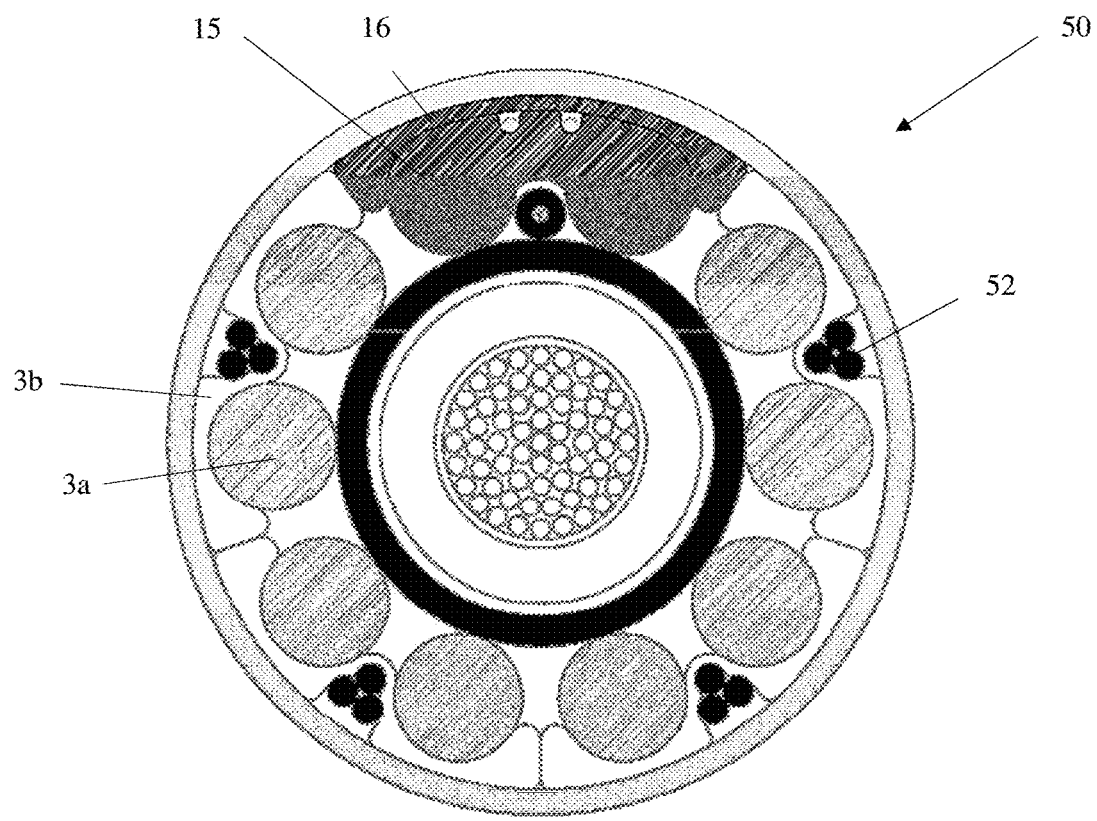
FIG. 9a-9c shows various embodiments of a power umbilical with strength elements arranged in the umbilical.
Figure 9B:
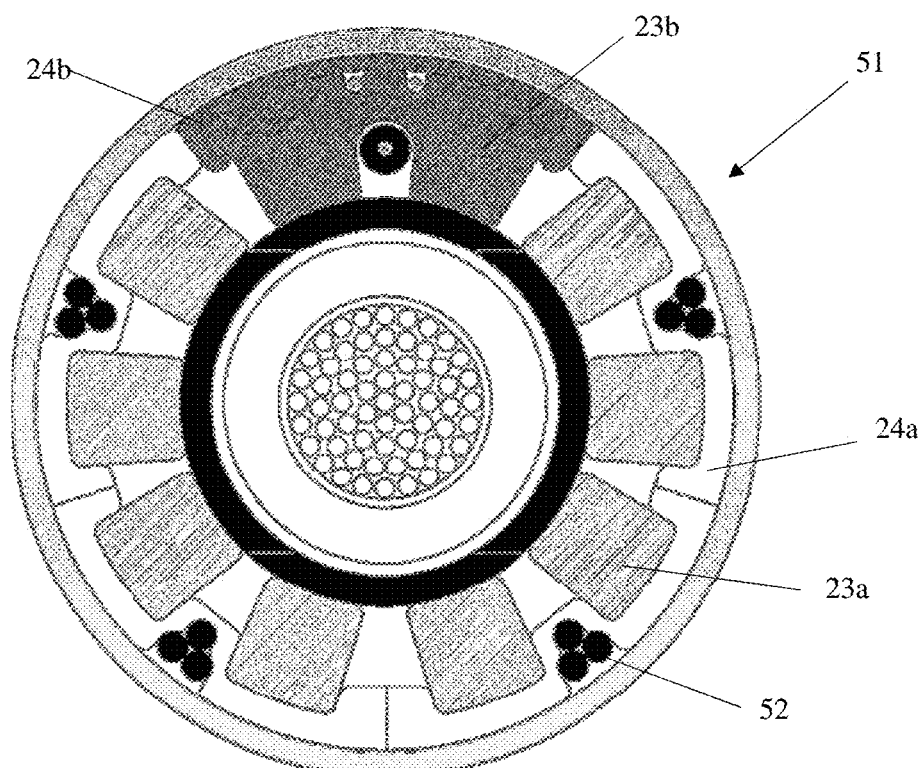
Figure 9C:
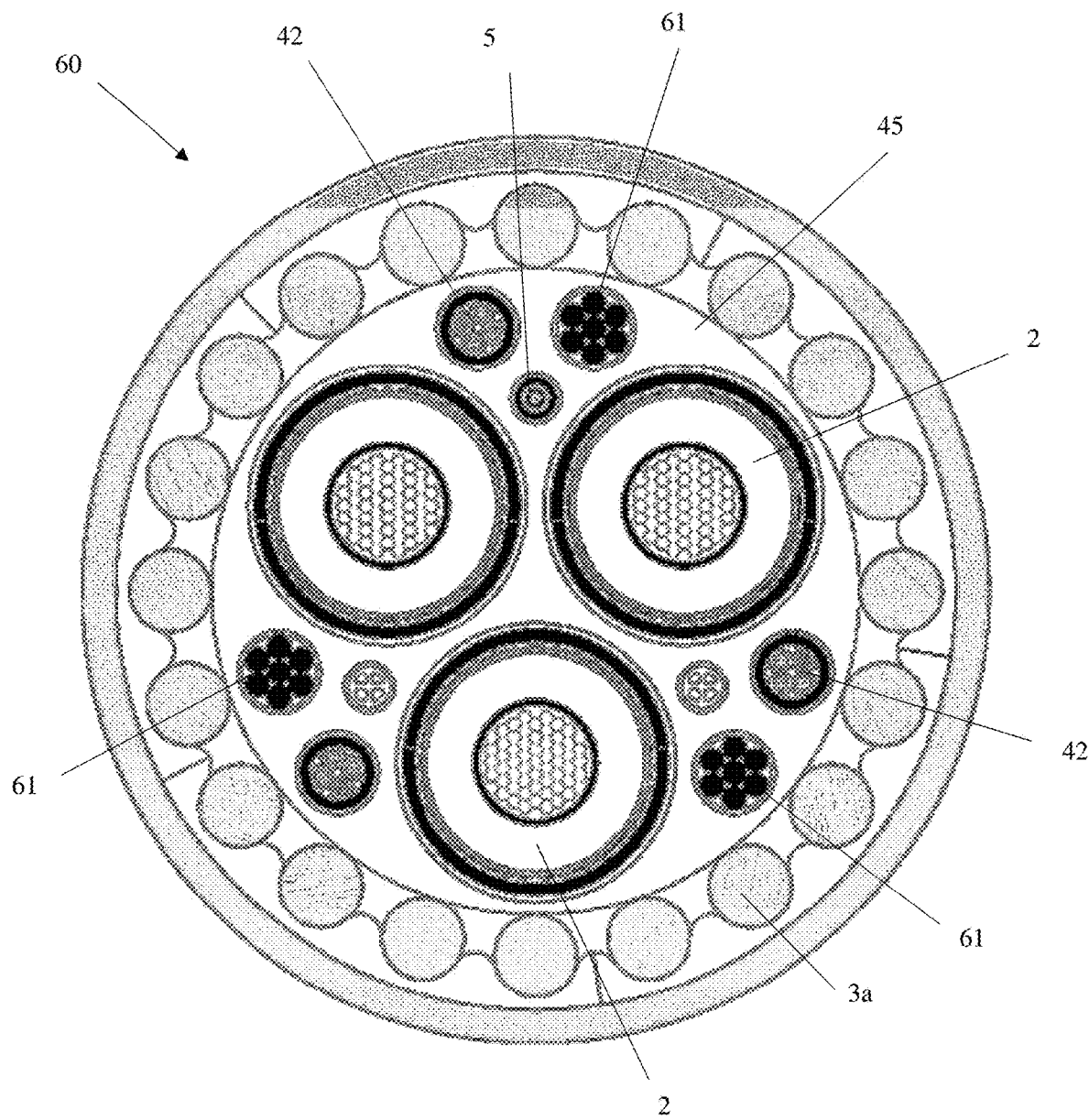

FIG. 9a-c shows the power umbilical with deformable rods similar to the embodiments of FIGS. 4, 5 and 8. In addition the power umbilicals 50, 51, 60 in the FIGS. 9a, 9b and 9c have a plurality of strength elements arranged in the power umbilical 50, 51, 60. In FIGS. 9a and 9b, these strength elements are arranged in a recess of the outer layer element 3b and the outer sheath 7. While in the FIG. 9c, the strength element 61 are arranged in a space of the center fillers, in a similar way as the fiber optic cable or the electrical control line 42. The strength elements may also be included in the deformable rods in all the embodiments of the invention (not shown). The strength elements 51, 61 may for instance be of metal, yarn or other suitable material. The strength elements may also be a bundle of several individual strength rods as shown in the figures. When the power umbilical is a DEH cable, the strength elements must however be of a nonmetallic material.

The embodiment of the power umbilical of figure is however not restricted to the elements of the power umbilical disclosed in the figure. The power umbilical may be any one of a single cable or multicore cable and variety of combination of possible further lines or cables. The power umbilical according to the invention may also have addition of strength elements, such as carbon fibre rods.

The invention also may be an integrated production flowline where there is a production flowline in addition to the control lines (not shown).

The invention claimed is:

1. A subsea umbilical comprising:
    a conduit comprising at least one of an electrical conductor and a fluid pipe;
    an outer sheath surrounding the conduit;
    a plurality of deformable rods evenly distributed between the conduit and the outer sheath for radial load protection of the conduit;
    wherein a space is formed in a gap between two adjacent deformable rods of the plurality of deformable rods;
    an outer layer element arranged between the sheath and at least one of the plurality of deformable rods;
    wherein the outer layer element is formed such that a respective deformable rod of the two adjacent deformable rods mates with the outer layer element to form, along with an adjacent deformable rod, the space such that the respective deformable rod is constrained within the subsea umbilical when the respective deformable rod is being deformed and to allow the two adjacent deformable rods to deform into the space when exposed to a radial impact force; and
    wherein the outer layer element is of a material of higher mechanical hardness than that of the plurality of deformable rods.

2. The subsea umbilical according to claim 1, wherein the outer sheath is of a mechanically harder material than the deformable rods.

3. The subsea umbilical according to claim 1, wherein the two adjacent deformable rods are separated by a wedge forming an integrated part of the outer layer element or a bridge separately arranged from the outer layer element.

4. The subsea umbilical according to claim 3, wherein at least one of the plurality of deformable rods is a double deformable rod having substantially the same shape as a combination of two neighboring single deformable rods and the wedge, the remaining deformable rods being single deformable rods.

5. The subsea umbilical according to claim 1, wherein at least two of the plurality of deformable rods have different mechanical hardness.

6. The umbilical according to claim 1, wherein the deformable rods have a cross-sectional shape selected from the group consisting of:
    cylindrical;
    square;
    triangular; and
    trapezoidal.

7. The subsea umbilical according to claim 1, comprising at least one fiber optic cable arranged in a location selected from:
    the space; and
    a recess of one of the plurality of deformable rods.

8. The subsea umbilical according to claim 7, wherein deformable rods arranged next to the at least one fiber optic cable have a higher mechanical hardness than remaining deformable rods.

9. The subsea umbilical according to claim 1, wherein at least one of the following is semi-conductive:
    the plurality of deformable rods; and
    the outer layer element.

10. The subsea umbilical according to claim 1, wherein at least one of:
    the outer sheath is semiconductive; and
    the subsea umbilical has formed therein radially extending holes through the outer sheath for draining off capacitive currents when the subsea umbilical is deployed at sea.

11. The subsea umbilical according to claim 1, comprising an embedded metal rod or tape embedded in at least one of the following elements for draining off capacitive currents when the elongated member is used in testing operations onshore:
    the deformable rod;
    the outer layer element; and
    a wedge.

12. The subsea umbilical according to claim 1, comprising at least one of the following elements, the at least one element being arranged interior of the plurality of deformable rods:
    an additional conductor;
    a fluid pipe;
    a fiber optical cable; and
    a control cable.

13. The subsea umbilical according to claim 1, wherein the two adjacent deformable rods are selected from the group consisting of:

two single deformable rods;
two double deformable rods; and
a single deformable rod and a double deformable rod.

14. The subsea umbilical according to claim 1, comprising a plurality of outer layer elements arranged between the sheath and the plurality of deformable rods.

\* \* \* \* \*